United States Patent
Choi et al.

(10) Patent No.: US 10,355,792 B2
(45) Date of Patent: Jul. 16, 2019

(54) SYSTEM AND METHOD FOR FREQUENCY ESTIMATION BIAS REMOVAL

(71) Applicant: Samsung Electronics Co., Ltd., Suwon-si, Gyeonggi-do (KR)

(72) Inventors: Yoo Jin Choi, San Diego, CA (US); Dongwoon Bai, San Diego, CA (US); Linbo Li, San Diego, CA (US); Farrokh Etezadi, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/462,639

(22) Filed: Mar. 17, 2017

(65) Prior Publication Data

US 2018/0205470 A1 Jul. 19, 2018

Related U.S. Application Data

(60) Provisional application No. 62/448,328, filed on Jan. 19, 2017.

(51) Int. Cl.
*H04B 1/10* (2006.01)
*H04B 17/336* (2015.01)
(Continued)

(52) U.S. Cl.
CPC ........... *H04B 17/336* (2015.01); *H04B 17/21* (2015.01); *H04L 27/10* (2013.01); *H04L 27/148* (2013.01)

(58) Field of Classification Search
CPC ........ H04B 17/21; H04B 1/28; H04B 17/336; H04B 1/1036; H04B 1/30; H04L 27/148;
(Continued)

(56) References Cited

U.S. PATENT DOCUMENTS 7,570,722 B1 * 8/2009 Lee ........................ H04B 7/01
375/316
7,639,766 B2 12/2009 Wei
(Continued)

FOREIGN PATENT DOCUMENTS

CN 101414873 A 4/2009
CN 1881970 B 1/2011
(Continued)

OTHER PUBLICATIONS

Cao, Shengjiao et al., "Full-Range Pilot-Assisted Frequency Offset Estimation for OFDM Systems", Optical Fiber Communications Conference, vol. 1, 2013 (4 pages).
(Continued)

*Primary Examiner* — Zewdu A Kassa
(74) *Attorney, Agent, or Firm* — Lewis Roca Rothgerber Christie LLP

(57) ABSTRACT

A system and method for removing bias from a frequency estimate. A simulation is used to predict, for various values of the signal to noise ratio, a bias in a raw frequency estimate produced by a frequency estimation algorithm. A straight line is fit to simulated frequency offset estimates as a function of true frequency offset, and the reciprocal of the slope of the line is stored, as a multiplicative bias removal term, in a lookup table, for the simulated signal to noise ratio. In operation, the raw frequency estimate is multiplied by a multiplicative bias removal term, obtained from the lookup table, to form a corrected frequency offset estimate.

20 Claims, 12 Drawing Sheets

(51) Int. Cl.
*H04L 27/148* (2006.01)
*H04L 27/10* (2006.01)
*H04B 17/21* (2015.01)

(58) Field of Classification Search
CPC .............. H04L 27/10; H04L 25/03038; H04L 27/2647; H04L 2025/03414; H04L 25/03057; H04L 1/20; H04N 5/4401
USPC .......................... 375/350, 346, 316, 219, 295
See application file for complete search history.

(56) References Cited

U.S. PATENT DOCUMENTS

| | | |
|---|---|---|
| 7,844,004 B2 | 11/2010 | De Rore |
| 8,125,885 B2 | 2/2012 | Bertrand et al. |
| 8,989,312 B2 | 3/2015 | Park et al. |
| 9,008,233 B2 | 4/2015 | Burzigotti et al. |
| 2004/0137851 A1 | 7/2004 | Akhter et al. |
| 2004/0190663 A1* | 9/2004 | Carsello .................. H04L 7/042 375/354 |
| 2005/0164639 A1* | 7/2005 | Suissa .................. H04L 25/062 455/63.1 |
| 2009/0122928 A1 | 5/2009 | Twitto |
| 2010/0222019 A1* | 9/2010 | Raza ......................... H03J 7/04 455/264 |
| 2011/0206107 A1* | 8/2011 | Bottomley ........... H04B 17/336 375/227 |

FOREIGN PATENT DOCUMENTS

| | | |
|---|---|---|
| KR | 10-2005-0034117 A | 4/2005 |
| WO | WO 2015/110155 A1 | 7/2015 |

OTHER PUBLICATIONS

Zhang, Zhongshan et al., "Robust Uplink Carrier Frequency Offset Estimation with Interference Mitigation in OFDMA Systems", IEEE Wireless Communications and Networking Conference, 2006. WCNC 2006. Year 2006, vol. 2, pp. 816-821.

Papadimitriou, Panayiotis et al., "Link-level Performance of an LTE UE Receiver in Synchronous and Asynchronous Networks", 2013, IEEE Wireless Communications and Networking Conference, pp. 3861-3866.

* cited by examiner

SYSTEM AND METHOD FOR FREQUENCY ESTIMATION BIAS REMOVAL

CROSS-REFERENCE TO RELATED APPLICATION(S)

The present application claims priority to and the benefit of U.S. Provisional Application No. 62/448,328, filed Jan. 19, 2017, entitled "SYSTEM AND METHOD FOR BIAS REMOVAL TO ENHANCE FREQUENCY OFFSET ESTIMATION", the entire content of which is incorporated herein by reference.

FIELD

One or more aspects of embodiments according to the present invention relate to frequency estimation, and more particularly to a system and method for removing bias from frequency estimates.

BACKGROUND

Frequency estimation may be performed, for example, in a receiver, as part of the process of demodulating a received signal. The received signal may include (e.g., consist of) a carrier modulated by a modulation signal. Certain frequency estimation methods may exhibit bias, resulting in a systematic error in the estimated frequency. Such a bias may degrade the performance of the receiver.

Thus, there is a need for a system and method for removing such a bias.

SUMMARY

Aspects of embodiments of the present disclosure are directed toward a system and method for removing bias from a frequency estimate. A simulation is used to predict, for various values of the signal to noise ratio, a bias in a raw frequency estimate produced by a frequency estimation algorithm. A straight line is fit to simulated frequency offset estimates as a function of true frequency offset, and the reciprocal of the slope of the line is stored, as a multiplicative bias removal term, in a lookup table, for the simulated signal to noise ratio. In operation, the raw frequency estimate is multiplied by a multiplicative bias removal term, obtained from the lookup table, to form a corrected frequency offset estimate.

According to an embodiment of the present invention there is provided a method, including: estimating a signal to noise ratio of a first signal; determining a multiplicative correction term as a function of the signal to noise ratio only; forming a raw estimate of a frequency of the first signal; and multiplying the multiplicative correction term and the raw estimate to form a corrected estimate of the frequency of the first signal.

In one embodiment, the forming of the raw estimate of the frequency of the first signal includes utilizing in-phase and quadrature domain autocorrelation based frequency estimation.

In one embodiment, the forming of the raw estimate of the frequency of the first signal includes utilizing normalized in-phase and quadrature domain autocorrelation based frequency estimation.

In one embodiment, the forming of the raw estimate of the frequency of the first signal includes utilizing frequency domain averaging based frequency estimation.

In one embodiment, the determining of the multiplicative correction term includes simulating behavior of a processing circuit executing frequency offset estimation.

In one embodiment, the method includes a plurality of multiplicative correction terms including the multiplicative correction term, each of the plurality of multiplicative correction terms corresponding to a different signal to noise ratio, and looking up the multiplicative correction term in the lookup table.

In one embodiment, the method includes a sum of a noiseless signal and the simulated noise; and simulating the behavior of the processing circuit when fed the simulated input.

In one embodiment, the generating of the simulated noise includes generating pseudorandom Gaussian white noise.

In one embodiment, the method includes demodulating the first signal.

In one embodiment, the demodulating of the first signal includes estimating a Gaussian frequency shift keying modulation in the first signal.

According to an embodiment of the present invention there is provided a system, including: a processing circuit, configured to: estimate a signal to noise ratio of a first signal; determine a multiplicative correction term as a function of the signal to noise ratio only; form a raw estimate of a frequency of the first signal; and multiply the multiplicative correction term and the raw estimate to form a corrected estimate of the frequency of the first signal.

In one embodiment, the forming of the raw estimate of the frequency of the first signal includes utilizing in-phase and quadrature domain autocorrelation based frequency estimation.

In one embodiment, the forming of the raw estimate of the frequency of the first signal includes utilizing normalized in-phase and quadrature domain autocorrelation based frequency estimation.

In one embodiment, the forming of the raw estimate of the frequency of the first signal includes utilizing frequency domain averaging based frequency estimation.

In one embodiment, the system includes demodulating the first signal.

In one embodiment, the demodulating of the first signal includes estimating a Gaussian frequency shift keying modulation in the first signal.

According to an embodiment of the present invention there is provided a receiver, including: a first analog to digital converter to receive an in-phase signal and form a sequence of in-phase samples; a second analog to digital converter to receive a quadrature phase signal and form a sequence of quadrature samples; and a processing circuit, to: form a sequence of complex numbers from the sequence of in-phase samples and the sequence of quadrature samples; estimate a signal to noise ratio of the sequence of complex numbers; determine a multiplicative correction term as a function of the signal to noise ratio only; form a raw estimate of a frequency of the sequence of complex numbers; and multiply the multiplicative correction term and the raw estimate to form a corrected estimate of the frequency of the sequence of complex numbers.

In one embodiment, the forming of the raw estimate of the frequency of the sequence of complex numbers includes utilizing: in-phase and quadrature domain autocorrelation based frequency estimation; or normalized in-phase and quadrature domain autocorrelation based frequency estimation.

In one embodiment, the forming of the raw estimate of the frequency of the sequence of complex numbers includes utilizing frequency domain averaging based frequency estimation.

In one embodiment, the receiver includes demodulating the sequence of complex numbers, wherein the demodulating of the sequence of complex numbers includes estimating a Gaussian frequency shift keying modulation in the sequence of complex numbers.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for frequency estimation bias removal provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In a radio frequency or microwave receiver, a received signal including a modulated carrier may be processed by various processing acts, for some of which it may be useful to have an estimate of the frequency of the carrier. For example if the carrier frequency is known, then the modulation may be expressed as amplitude and/or phase changes of the carrier. An error in estimating the carrier frequency may result in a time-varying phase in the estimated modulation that is absent from the true modulation, and that may degrade the performance of the receiver. As used hereinafter, the term "radio frequency" refers to any frequency at which it is feasible to transmit or receive electromagnetic waves with an antenna, and the term includes, for example, microwave frequencies.

The carrier frequency may be estimated by reference to a reference frequency. For example, in one embodiment, a received radio frequency signal is mixed with a reference (or "local oscillator") signal, using an in-phase and quadrature mixer (an IQ mixer) to form two intermediate frequency (IF) signals, i.e., an in-phase signal and a quadrature signal. Each of these signals is filtered with an anti-aliasing filter and converted to digital form by a respective analog to digital converter. The sequences of digital samples of the in-phase signal and a quadrature signal may be treated as a sequence of complex numbers (or a sequence of "complex digital samples of the received signal"), with, e.g., the real part of each complex number being the sample of the in-phase signal and the imaginary part of each complex number being the sample of the quadrature signal.

The frequency (i.e., the mean phase rate) of the sequence of complex numbers may be the frequency offset, i.e., the difference between the carrier frequency of the received signal and the frequency of the reference signal (also referred to herein as the "reference frequency"). The frequency offset may be positive or negative, as evidenced, for example, by whether the phase (or argument) of the sequence of complex numbers increases or decreases with time.

Figure 1A:
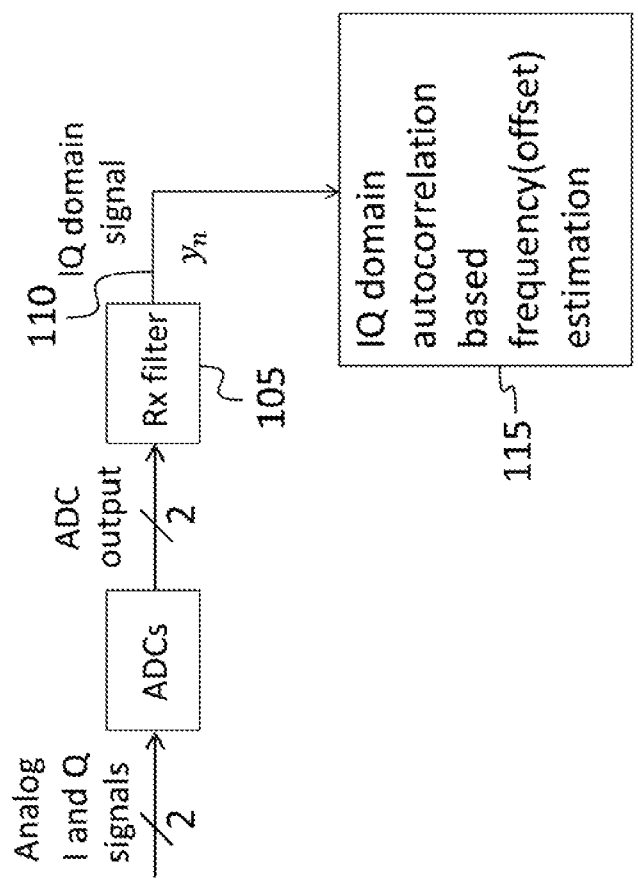
FIG. 1A is a block diagram of a system for frequency offset estimation, according to an embodiment of the present invention.

The frequency offset may be estimated using various methods. Referring to FIG. 1A, the sequence of complex numbers may first be filtered by a receiver filter 105, to produce a stream of filtered in-phase and quadrature data 110, which may be provided to a frequency offset estimator 115. The receiver filter 105 may be a low-pass filter, implemented, for example, as a digital finite impulse response (FIR) filter or as a digital infinite impulse response (IIR) filter. The frequency offset estimator 115 may be a circuit (e.g., a processing circuit, as discussed in further detail below), or a method, using, e.g., an in-phase and quadrature (IQ) domain autocorrelation based frequency (offset) estimation method to estimate the frequency offset as discussed in further detail below. A frequency offset estimate generated in this manner, if not corrected for bias, is referred to herein as a "raw" frequency offset estimate.

Figure 1B:
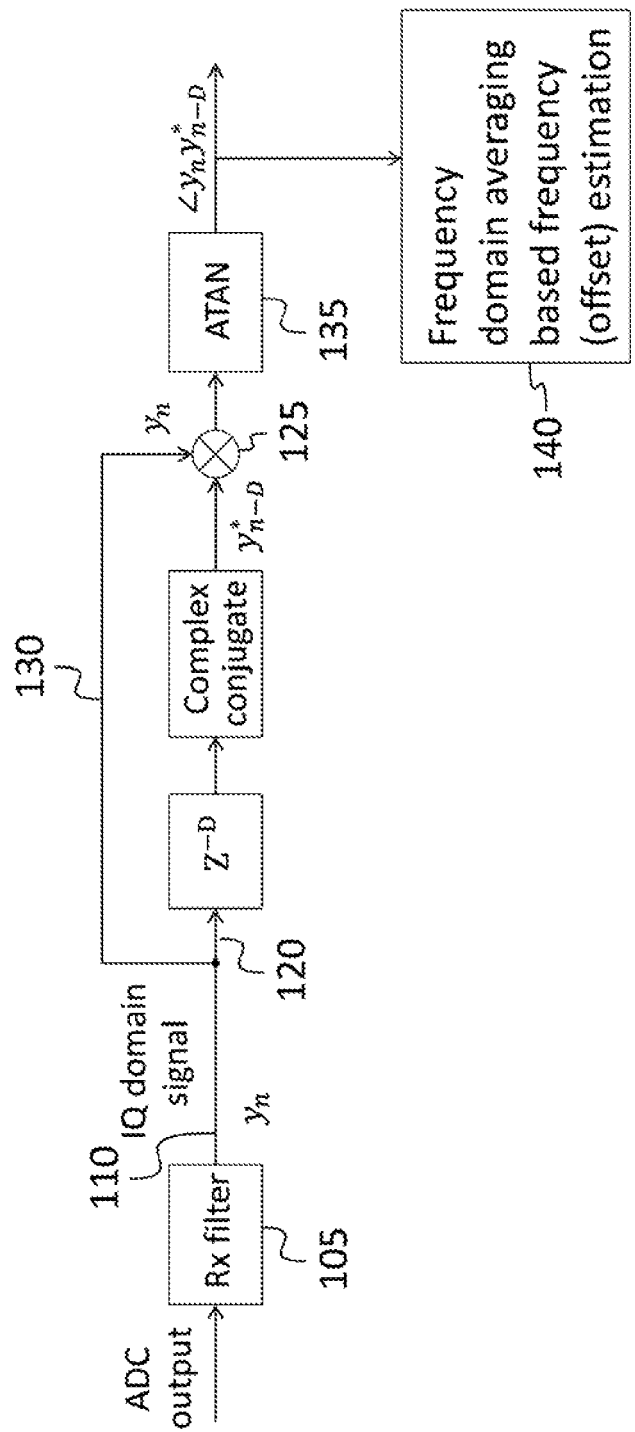
FIG. 1B is a block diagram of a system for frequency offset estimation, according to an embodiment of the present invention.

In another embodiment, referring to FIG. 1B, the sequence of complex numbers may first be filtered by the receiver filter 105, to produce a stream of filtered in-phase and quadrature data 110, as in the embodiment of FIG. 1A. The in-phase and quadrature data 110 may then, on a first path 120, be delayed by D samples, and the complex conjugate of each sample may be calculated (by changing the sign of the imaginary part); the data on this path may then be multiplied, in a multiplier 125 by data delivered to the multiplier 125 along a second path 130 (which does not include a delay or mathematical operation). The inverse tangent (or arc tangent or "ATAN") of each product may then be calculated, in an inverse tangent block 135, to form the argument of the product (i.e., a real number such that the absolute value of the (complex) product times the cosine of the argument is the real part of the product, and the absolute value of the product times the sine of the argument is the imaginary part of the product). The resulting sequence of arguments may then be provided to a frequency offset estimator 140. The frequency offset estimator 140 may be a circuit (e.g., a processing circuit, as discussed in further detail below), or a method, using a frequency domain averaging based frequency (offset) estimation method to estimate the frequency offset as discussed in further detail below. A frequency offset estimate generated in this manner, if not corrected for bias, is also referred to herein as a "raw" frequency offset estimate.

As mentioned above, the frequency offset estimator 115 of FIG. 1A may use an in-phase and quadrature (IQ) domain autocorrelation based frequency (offset) estimation method to estimate the frequency offset. In one embodiment this estimator 115 calculates the estimated frequency offset $\hat{f}_o$ according to the following equation:

$$\hat{f}_o = \frac{1}{2\pi D T_s} \angle \sum_n w_n y_n y_{n-D}^*,$$

where D is a positive integer (e.g., in the range 1–10), each $y_n$ is one of the complex digital samples of the received signal, $T_s$ is the sampling time interval for the samples $y_n$, the asterisk denotes a complex conjugate, and the $w_n$ are weights, which may for example be constant (independent of n) and which may be equal to 1.0 or another positive real number. The sum may be performed over all n (e.g., it may be a running sum), or it may be a moving average, e.g., a sum over the current sample and a fixed number of preceding samples. The $\angle$ operator denotes the argument (or phase), calculated, e.g., using an inverse tangent operation.

In another embodiment, the frequency offset estimator 115 of FIG. 1A may use a normalized in-phase and quadrature domain autocorrelation based frequency (offset) estimation method to estimate the frequency offset. In one embodiment this estimator 115 calculates the estimated frequency offset $\hat{f}_o$ according to the following equation:

$$\hat{f}_o = \frac{1}{2\pi D T_s} \angle \left( \sum_n w_n \frac{y_n y_{n-D}^*}{|y_n||y_{n-D}|} \right).$$

In this equation the pairs of vertical bars connote the absolute value operator.

As mentioned above, the frequency offset estimator 140 may use a frequency domain averaging based frequency (offset) estimation method to estimate the frequency offset. In one embodiment this estimator 140 calculates the estimated frequency offset $\hat{f}_o$ according to the following equation:

$$\hat{f}_o = \frac{1}{2\pi D T_s} \sum_n w_n \angle y_n y_{n-D}^*.$$

The behavior of the systems of FIGS. 1A and 1B may be modeled using a simulation, e.g., a Monte-Carlo simulation in which the received signal is modeled as an ideal (noiseless) received signal (e.g., including a carrier the amplitude and/or phase of which varies with time according to an applied modulation signal) and noise (e.g., additive white Gaussian noise). Simulated additive white Gaussian noise may be generated, for example, with a pseudorandom noise generator, the output of which (if it is uniformly distributed over some interval) may be transformed, to have a probability density function that is approximately Gaussian, by mapping it (e.g., using a lookup table) using an inverse cumulative Gaussian (e.g., an inverse cumulative normal) function.

Such simulations may show a bias towards zero on the frequency estimate. The simulations may further show that the bias depends on the signal to noise ratio (SNR) of the received signal.

Figure 2A:
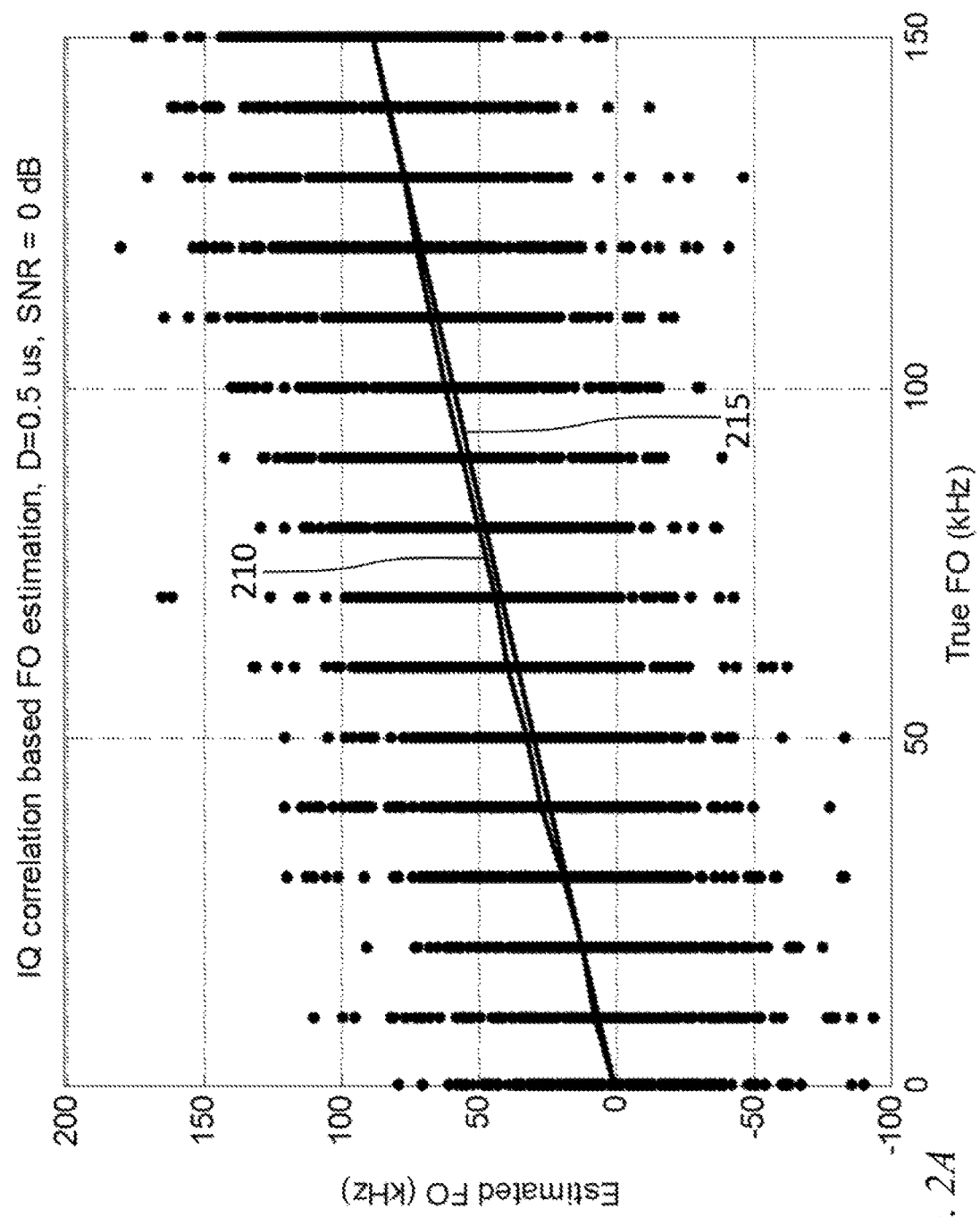
FIG. 2A is a graph of simulated frequency estimates, according to an embodiment of the present invention.

FIG. 2A shows the result of such a simulation, based on an embodiment of the kind illustrated in FIG. 1A, with the frequency offset estimation performed using an in-phase and quadrature (IQ) domain autocorrelation based frequency (offset) estimation method, with $DT_s$ having a value corresponding to an interval of 0.5 microseconds (us) (e.g., with D=8 and $T_s$=0.0625 us), and with a signal to noise ratio of 0 dB. To generate the results of FIG. 2A, a plurality of simulations was run at each of a plurality of test frequencies, ranging from 0 kHz to 150 kHz in increments of 10 kHz. In the scatterplot of FIG. 2A, each circular dot represents the result of a simulation run with a different pseudorandom seed. A first curve 210 is drawn through the respective averages of the points at each of the test frequencies, and a second curve 215 is a straight line drawn through the endpoints of the first curve 210. It can be seen that the first curve closely approximates the straight line drawn through its endpoints, i.e., to a good approximation the frequency offset estimate is a linear function of the frequency estimate. Moreover, it can be seen that the straight line passes approximately through the origin (i.e., the offset frequency estimate is approximately zero when the frequency offset is approximately zero) and the slope is less than 1 (i.e., for each value of the frequency offset, the offset frequency estimate is approximately equal to a fraction of the frequency offset). The fraction is, as can be seen from FIG. 2A, approximately independent of the frequency offset.

Accordingly, a more accurate frequency offset estimate may be generated by including a multiplicative bias removal term in the equation used to generate the frequency offset estimate. The equation for the in-phase and quadrature (IQ) domain autocorrelation based frequency (offset) estimation method may be replaced, for example, with $$\hat{f}_o = \beta(\widehat{SNR}) \cdot \frac{1}{2\pi D T_s} \angle \left( \sum_n w_n y_n y_{n-D}^* \right)$$

where $\beta(\widehat{SNR})$ is the multiplicative bias removal term, which, as shown, is a function only of the signal to noise ratio, and not, for example, of the frequency offset. The multiplicative bias removal term may be the reciprocal of the slope of a straight line (e.g., the line 215 in FIG. 2A) fit to the simulation data.

A rough estimate of the signal to noise power ratio (SNR) may be obtained from the variation of the frequency discriminator output (i.e., $\angle y_n - \angle y_{n-D}$) for Gaussian frequency shift keying (GFSK) signals. At low SNR, clicks and spikes may appear at a higher rate in the output of the frequency discriminator, which may result in a higher variance.

Figure 2B:
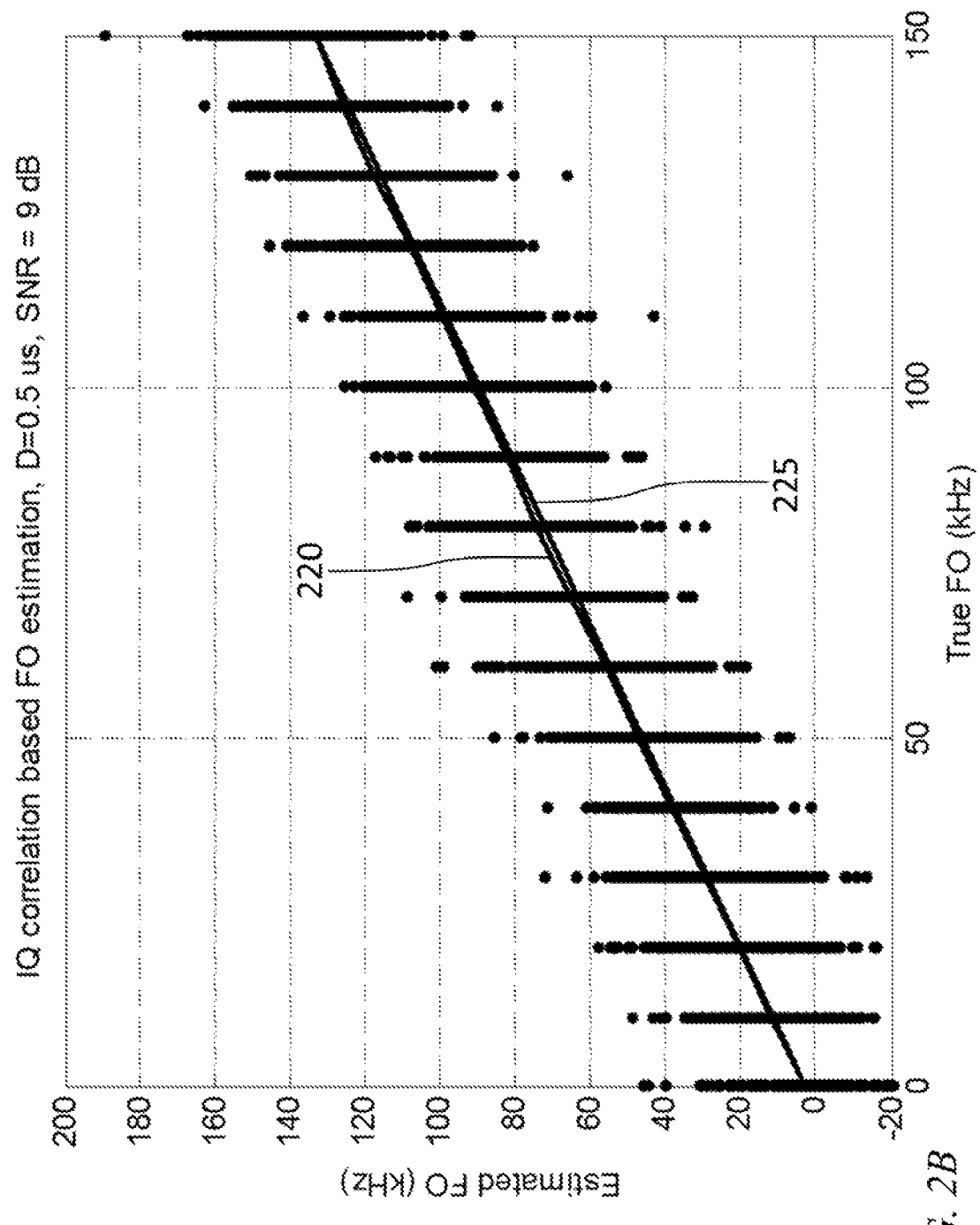
FIG. 2B is a graph of simulated frequency estimates, according to an embodiment of the present invention.

FIG. 2B shows a scatterplot showing the results of a simulation with the same parameters as those of FIG. 2A, except that in FIG. 2B, the simulated signal to noise ratio is 9 dB instead of 0 dB. A first curve 220 is drawn through the respective averages of the points at each of the test frequencies, and a second curve 225 is a straight line drawn through the endpoints of the first curve 220. In this further example it may also be seen that the first curve closely approximates the straight line drawn through its endpoints, i.e., to a good approximation, the frequency offset estimate is a linear function of the frequency estimate.

Figure 3A:
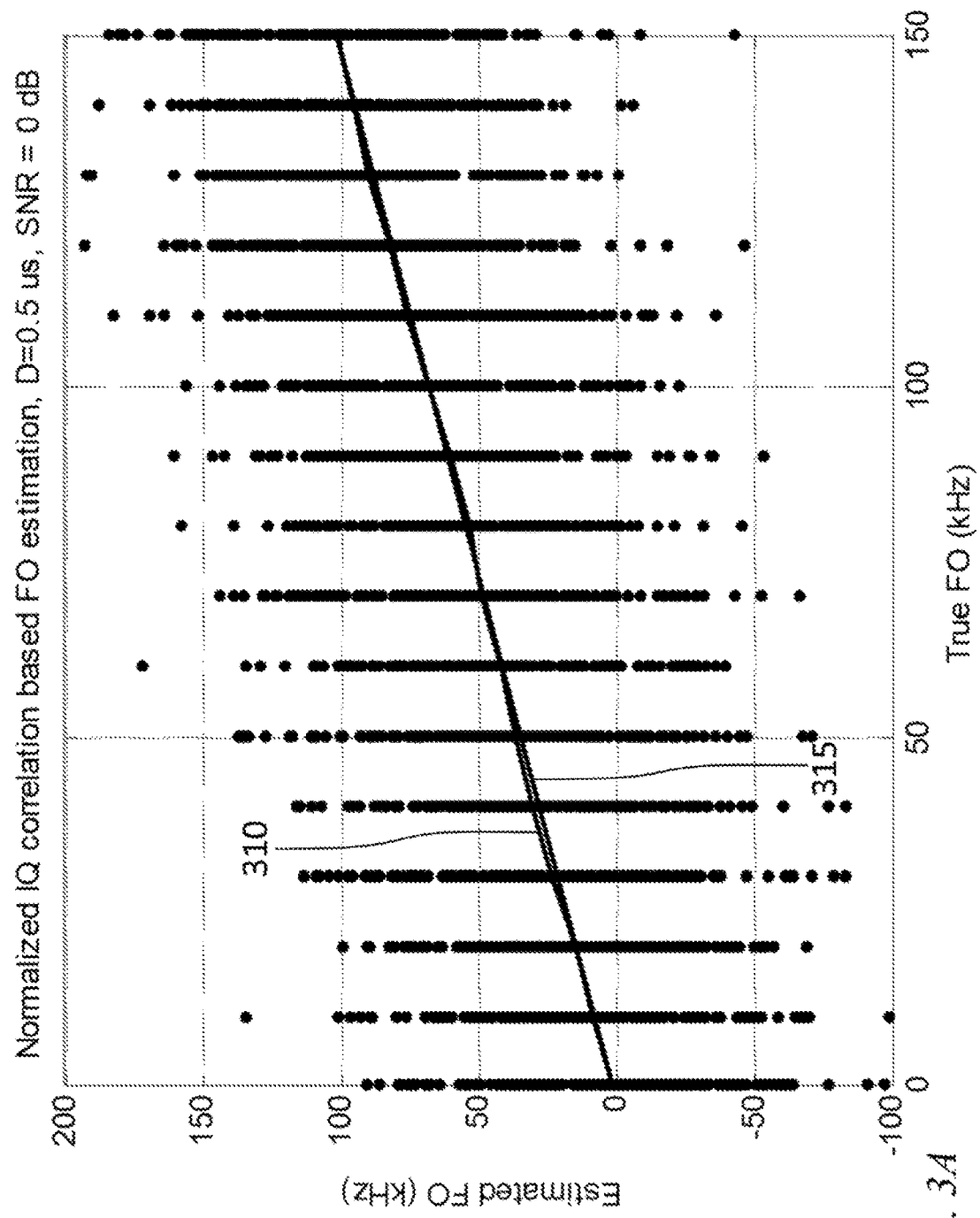
FIG. 3A is a graph of simulated frequency estimates, according to an embodiment of the present invention.
Figure 3B:
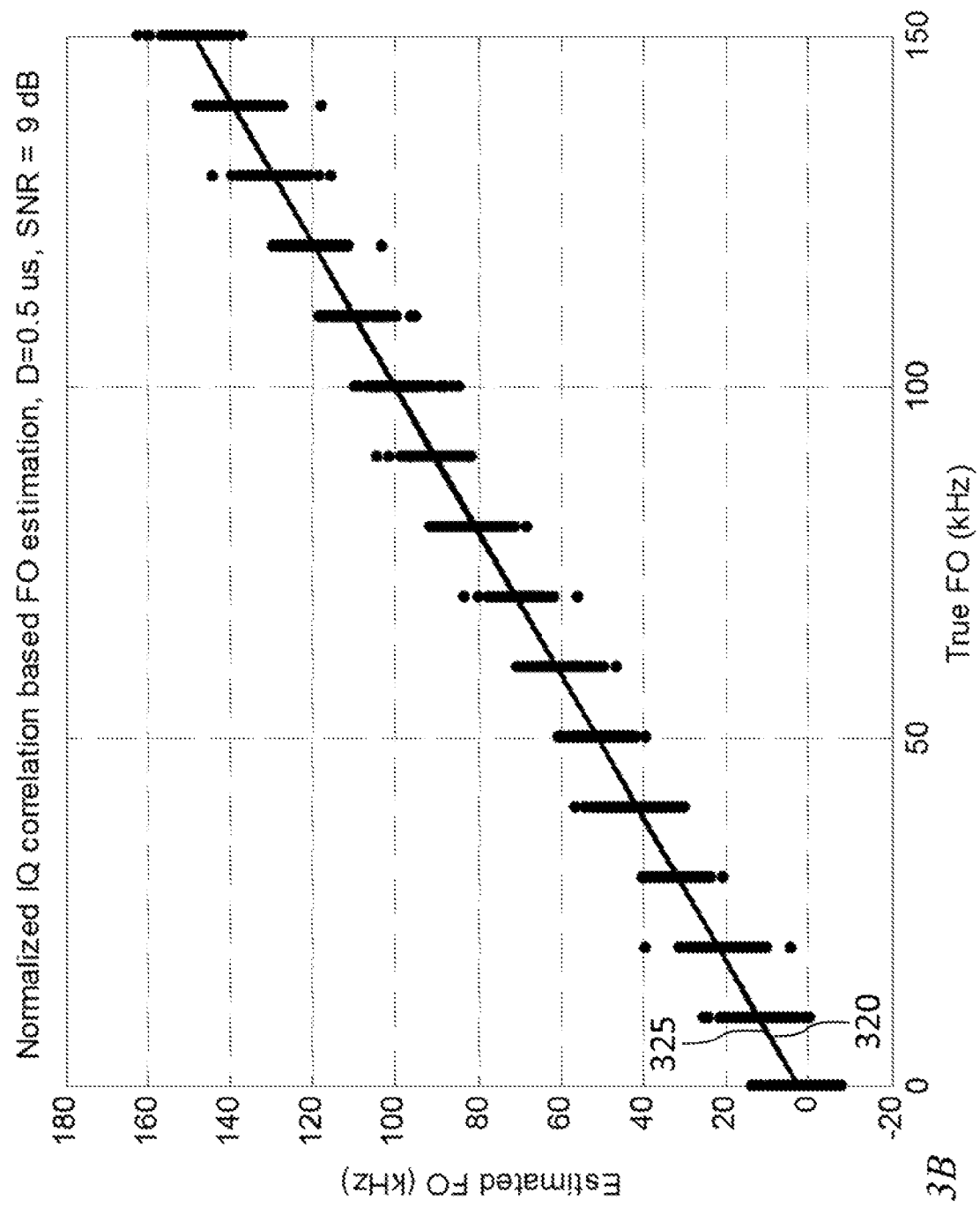
FIG. 3B is a graph of simulated frequency estimates, according to an embodiment of the present invention.

FIG. 3A shows the result of another simulation, based on an embodiment of the kind illustrated in FIG. 1A, with the frequency offset estimation performed using a normalized in-phase and quadrature (IQ) domain autocorrelation based frequency (offset) estimation method, with $DT_s$ having a value corresponding to an interval of 0.5 microseconds (us) (e.g., with D=8 and $T_s$=0.0625 us), and with a signal to noise ratio of 0 dB. As in the case of FIG. 2A, to generate the results of FIG. 3A, a plurality of simulations was run at each of a plurality of test frequencies, ranging from 0 kHz to 150 kHz in increments of 10 kHz. In the scatterplot of FIG. 3A, each circular dot represents the result of a simulation run with a different pseudorandom seed. A first curve 310 is drawn through the respective averages of the points at each of the test frequencies, and a second curve 315 is a straight line drawn through the endpoints of the first curve 310. As in the case of FIG. 2A, it can be seen that to a good approximation, the frequency offset estimate differs from the frequency offset only by a multiplicative factor that is independent of the frequency offset. The same conclusion may be drawn from FIG. 3B, which shows a scatterplot showing the results of a simulation with the same parameters as those of FIG. 3A, except that in FIG. 3B, the simulated signal to noise ratio is 9 dB instead of 0 dB. A first curve 320 is drawn through the respective averages of the points at each of the test frequencies, and a second curve 325 is a straight line drawn through the endpoints of the first curve 320. In this further example it may also be seen that the first curve closely approximates the straight line drawn through its endpoints, i.e., to a good approximation, the frequency offset estimate is a linear function of the frequency estimate.

Figure 4A:
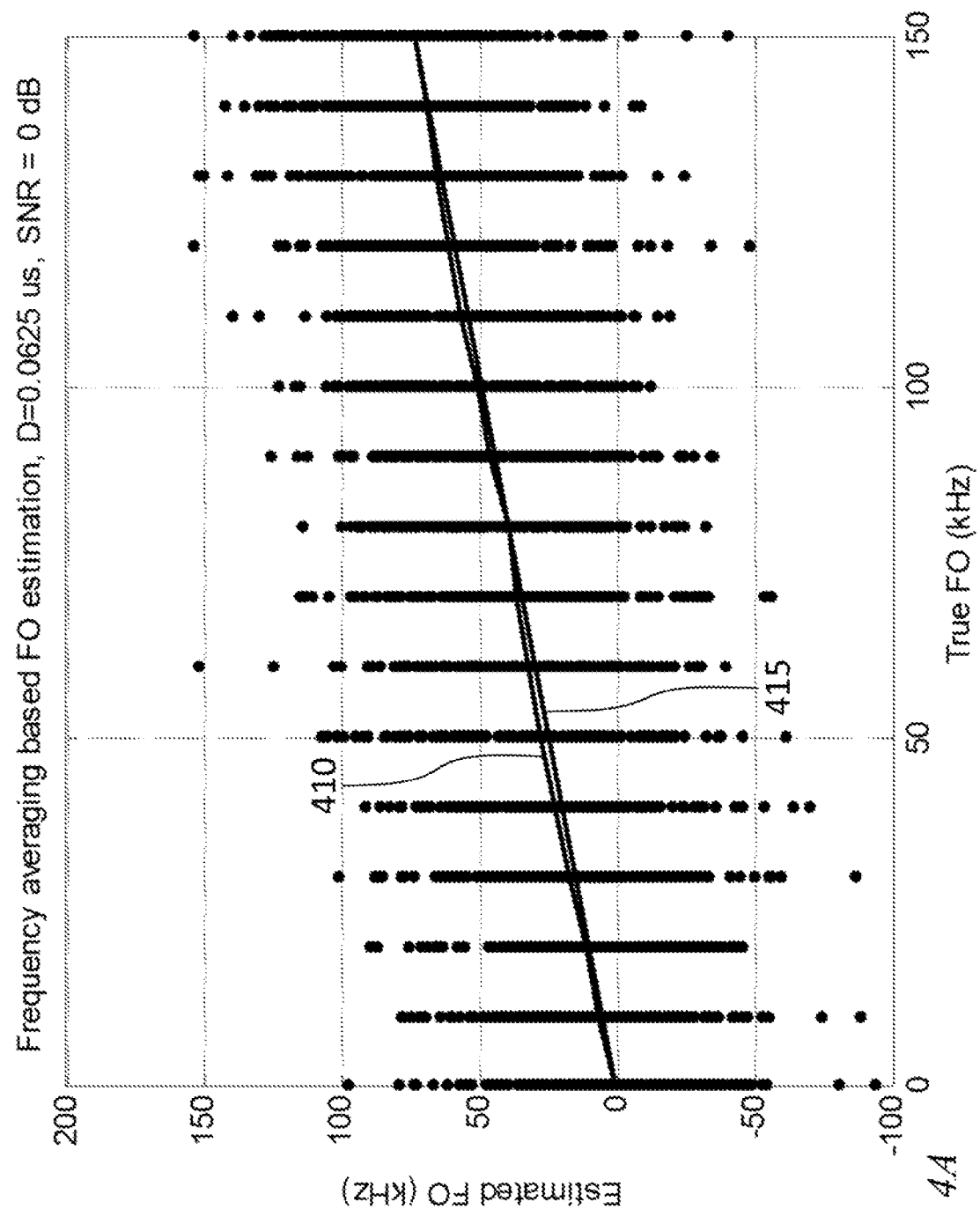
FIG. 4A is a graph of simulated frequency estimates, according to an embodiment of the present invention.
Figure 4B:
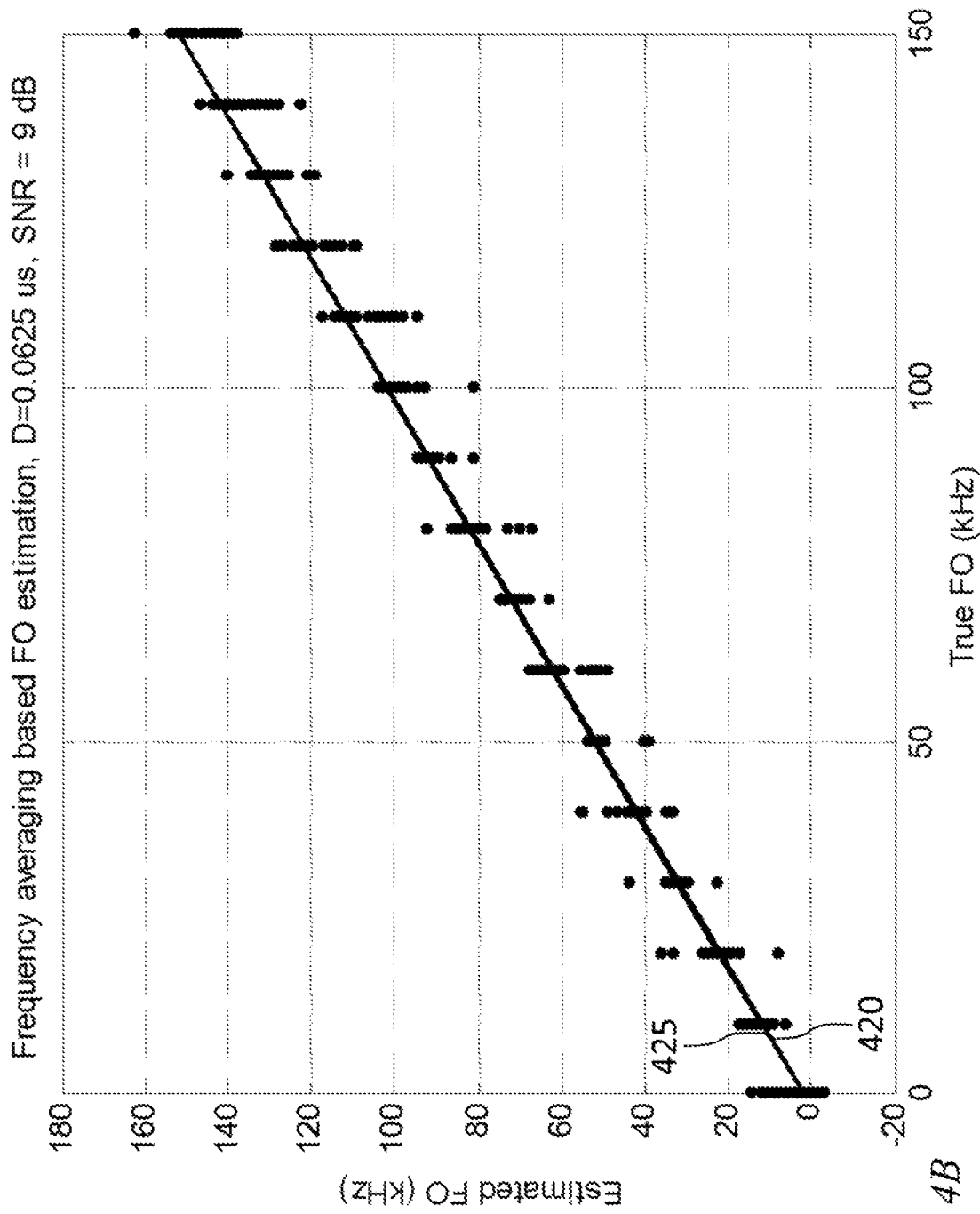
FIG. 4B is a graph of simulated frequency estimates, according to an embodiment of the present invention.

FIG. 4A shows the result of another simulation, based on an embodiment of the kind illustrated in FIG. 1B, with the frequency offset estimation performed using a frequency domain averaging based frequency (offset) estimation method, with $DT_s$ having a value corresponding to an interval of 0.5 microseconds (us) (e.g., with D=8 and $T_s$=0.0625 us), and with a signal to noise ratio of 0 dB. As in the case of FIG. 2A, to generate the results of FIG. 4A, a plurality of simulations was run at each of a plurality of test frequencies, ranging from 0 kHz to 150 kHz in increments of 10 kHz. In the scatterplot of FIG. 4A, each circular dot represents the result of a simulation run with a different pseudorandom seed. A first curve 410 is drawn through the respective averages of the points at each of the test frequencies, and a second curve 415 is a straight line drawn through the endpoints of the first curve 410. As in the case of FIG. 2A, it can be seen that to a good approximation the frequency offset estimate differs from the frequency offset only by a multiplicative factor that is independent of the frequency offset. The same conclusion may be drawn from FIG. 4B, which shows a scatterplot showing the results of a simulation with the same parameters as those of FIG. 4A, except that in FIG. 4B, the simulated signal to noise ratio is 9 dB instead of 0 dB. A first curve 420 is drawn through the respective averages of the points at each of the test frequencies, and a second curve 425 is a straight line drawn through the endpoints of the first curve 420. In this further example it may also be seen that the first curve closely approximates the straight line drawn through its endpoints, i.e., to a good approximation the frequency offset estimate is a linear function of the frequency estimate.

Such simulations may be used to create a lookup table listing, for each of a plurality of values of the signal to noise ratio, a corresponding multiplicative bias removal term. In operation, the system may generate a raw frequency offset estimate and multiply it by the appropriate multiplicative bias removal term (depending on the estimated signal to noise ratio of the received signal), to form a corrected frequency offset estimate.

The received signal may then be demodulated to generate a stream of received digital data. For example, if the modulation is GFSK, the complex samples may be rotated by an amount proportional to time and to the corrected estimated offset frequency, so that any remaining phase rate (either positive or negative) may then correspond to the modulation states. To estimate the modulation in the signal after removal of the phase rate due to the frequency offset, the phase rate may be estimated and using a decision block or decision method to infer the corresponding bit, in each bit interval.

Figure 5A:
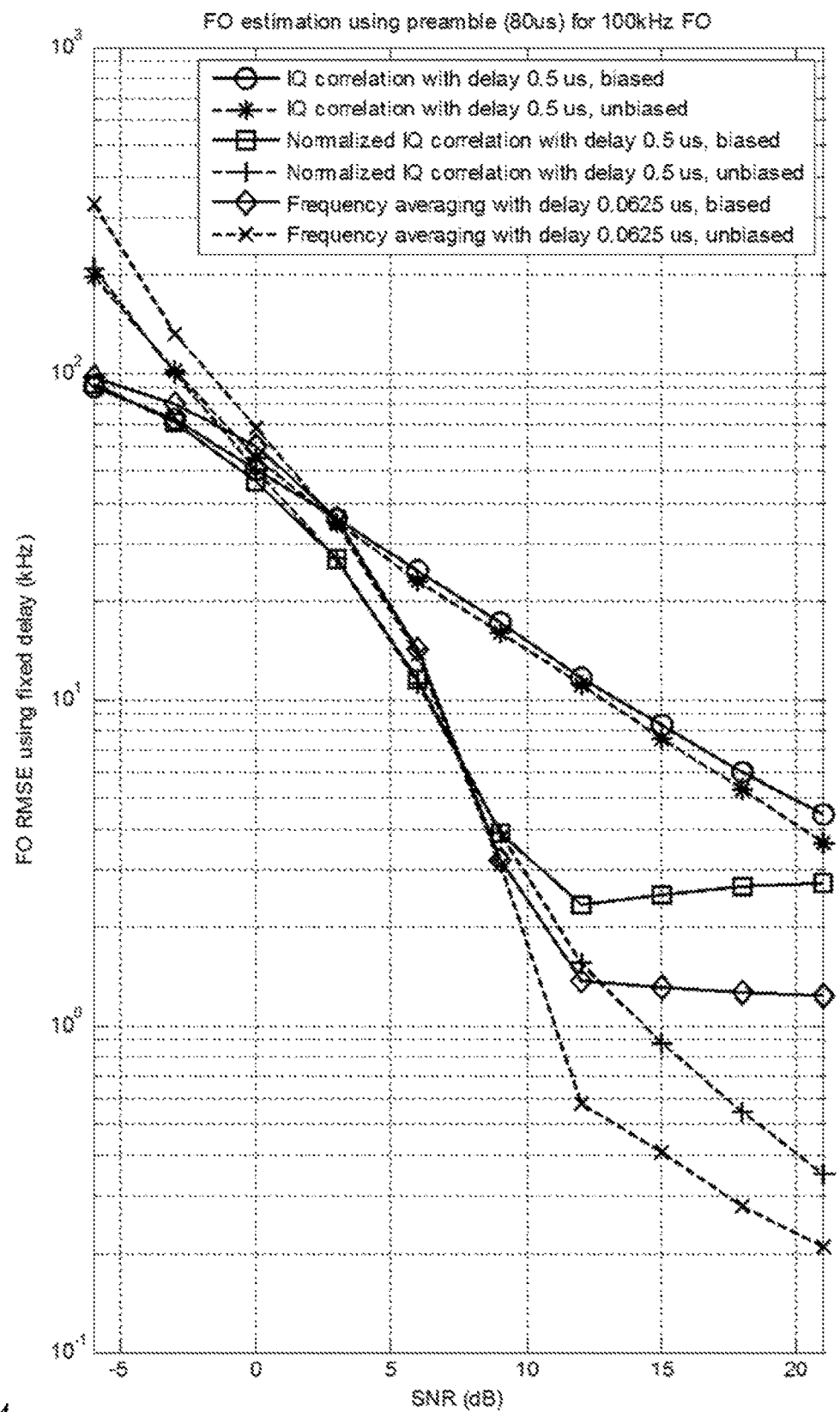
FIG. 5A is a graph of simulated frequency estimate root mean squared error, according to an embodiment of the present invention.

Accordingly, in each of these cases, the inclusion of a multiplicative bias removal term in the equation used to generate the frequency offset estimate (or, equivalently, the correcting of a raw frequency estimate by multiplying by a multiplicative bias removal term) may result in a more accurate frequency offset estimate. FIG. 5A shows the effect on root mean square error (RMSE) of the frequency offset estimate (FO), for a frequency offset of 100 kHz, as a function of signal to noise ratio (SNR) for the three different methods described above for estimating a frequency offset, i.e., the in-phase and quadrature (IQ) domain autocorrelation based frequency (offset) estimation method, the normalized in-phase and quadrature domain autocorrelation based frequency (offset) estimation method, and the frequency domain averaging based frequency (offset) estimation method. It may be seen from this graph that there is a significant reduction in root mean square error, especially at high signal to noise ratio and especially for the normalized in-phase and quadrature domain autocorrelation based frequency (offset) estimation method, and for the frequency domain averaging based frequency (offset) estimation method.

Figure 5B:
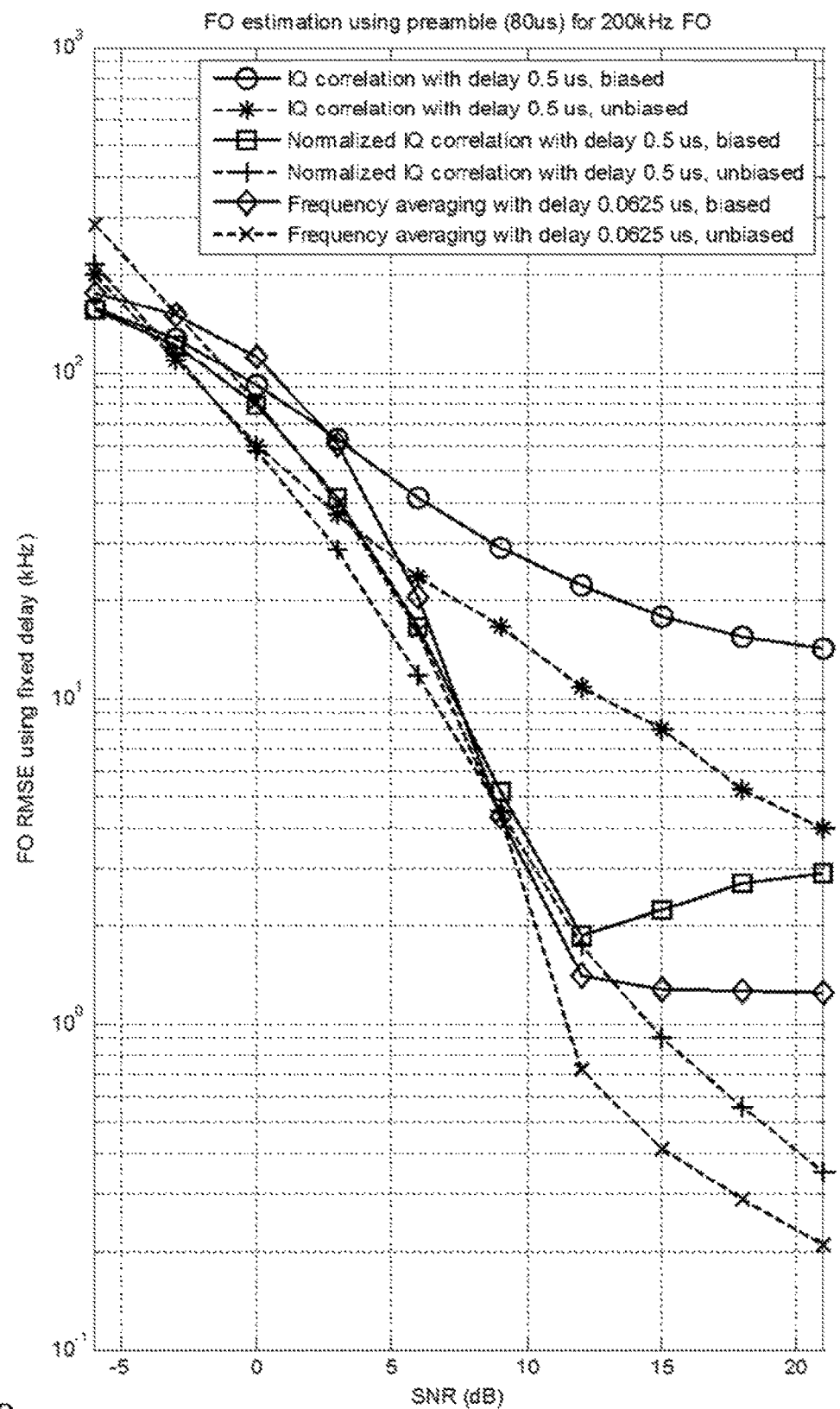
FIG. 5B is a graph of simulated frequency estimate root mean squared error, according to an embodiment of the present invention.

FIG. 5B shows a graph similar to that of FIG. 5A, showing the effect on root mean square error (RMSE) of the frequency offset estimate (FO), for a frequency offset of 150 kHz instead of 100 kHz. As in the case of FIG. 5A, it may be seen from this graph that there is a significant reduction in root mean square error, especially at high signal to noise ratio. In the case of FIG. 5B (i.e., when the frequency offset is 150 kHz), all three methods show a significant reduction in root mean square error at high signal to noise ratio.

Figure 6:
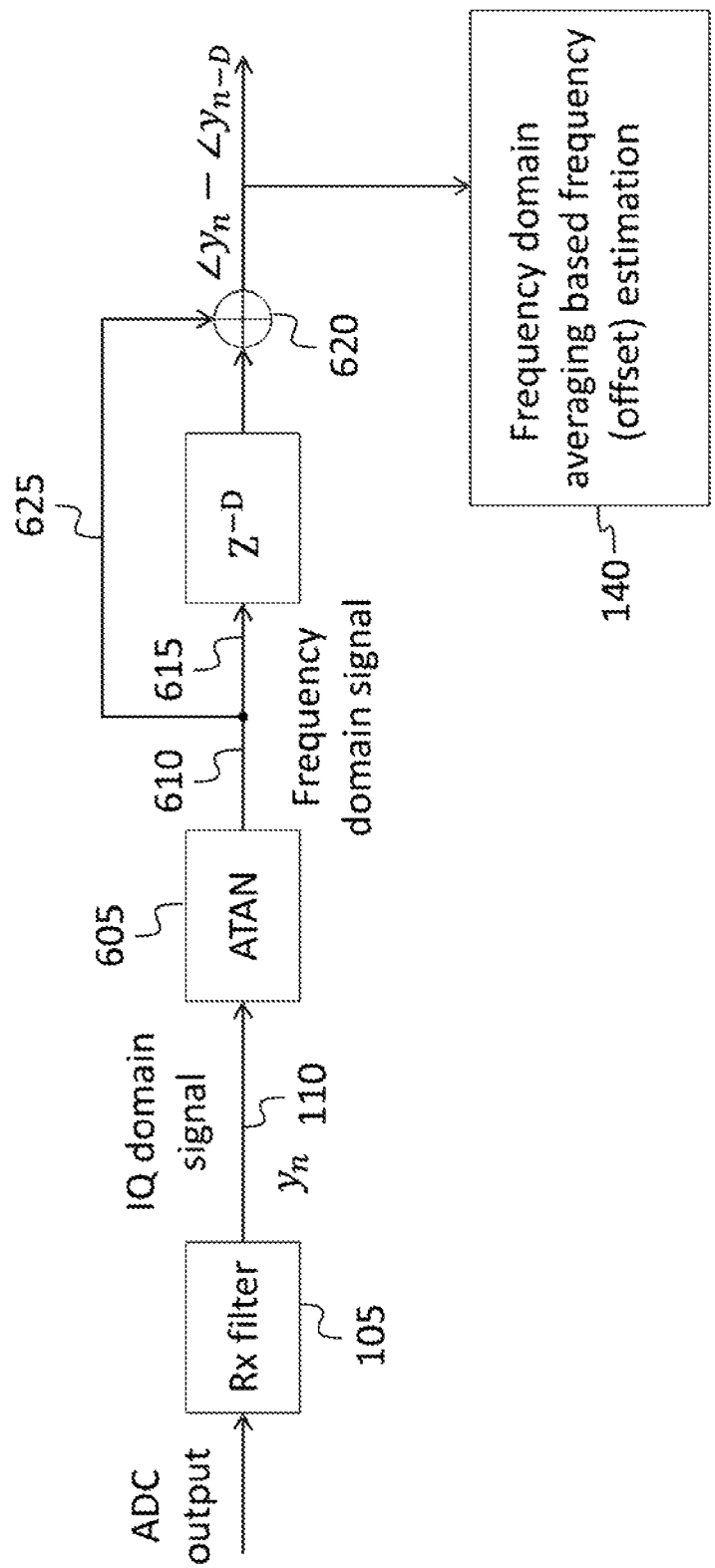
FIG. 6 is a block diagram of a system for frequency offset estimation, according to an embodiment of the present invention.

FIG. 6 shows a system and method for generating a raw frequency estimate using a frequency domain averaging based frequency (offset) estimation method, in an alternative embodiment to that illustrated in FIG. 1B. In the embodiment of FIG. 6, the sequence of complex numbers is first filtered by the receiver filter 105, to produce a stream of filtered in-phase and quadrature data 110, as in the embodiment of FIG. 1B. The inverse tangent (or arc tangent or "ATAN") of each product is then calculated, in an inverse tangent block 605, to produce a stream of arguments 610. The arguments 610 are then, on a first path 615, delayed by D samples, and the data on this path are subtracted, in a differencing circuit 620, from arguments delivered to the differencing circuit 620 along a second path 625 (which does not include a delay or mathematical operation). The resulting sequence of arguments (the sequence of outputs of the differencing circuit 620) may then be provided to the frequency offset estimator 140, as in the embodiment of FIG. 1B.

Figure 7:
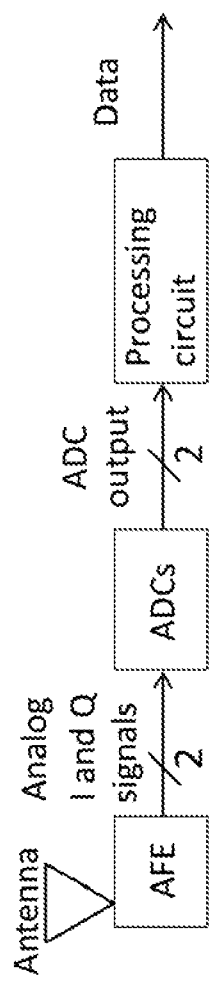
FIG. 7 is a block diagram of a receiver, according to an embodiment of the present invention.

FIG. 7 shows a receiver, according to one embodiment. An antenna receives a radio frequency signal, which is amplified and filtered in an analog front end. Also in the analog front end, the received signal is mixed down to an intermediate frequency with an in-phase and quadrature mixer, the local oscillator input of which is fed by a reference frequency source (or "local oscillator"). The pair of resulting analog signals (I and Q signals) is converted, by two analog to digital converters (ADCs), to a sequence of complex digital samples, which are fed to the processing circuit. The processing circuit forms corrected frequency offset estimates according, for example, to embodiments disclosed above.

As used herein, a frequency offset, i.e., the difference between a received frequency and a reference frequency, is itself a frequency. Accordingly, the terms "frequency", "frequency offset" and "frequency (offset)" may be used interchangeably.

In view of the foregoing, some embodiments provide a system and method for removing bias from a frequency estimate. A simulation is used to predict, for various values of the signal to noise ratio, a bias in a raw frequency estimate produced by a frequency estimation algorithm. A straight line is fit to simulated frequency offset estimates as a function of true frequency offset, and the reciprocal of the slope of the line is stored, as a multiplicative bias removal term, in a lookup table, for the simulated signal to noise ratio. In operation, the raw frequency estimate is multiplied by a multiplicative bias removal term, obtained from the lookup table, to form a corrected frequency offset estimate.

In some embodiments the methods described herein are performed by a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for frequency estimation bias removal have been specifically described and illustrated herein, many modifications and variations will be apparent to those skilled in the art. Accordingly, it is to be understood that a system and method for frequency estimation bias removal constructed according to principles of this invention may be embodied other than as specifically described herein. The invention is also defined in the following claims, and equivalents thereof.

What is claimed is:

1. A method, comprising:
   estimating a signal to noise ratio of a first signal;
   determining a multiplicative correction term as a function of the signal to noise ratio only;
   forming a raw estimate of a frequency of the first signal; and multiplying the multiplicative correction term and the raw estimate to form a corrected estimate of the frequency of the first signal, wherein the forming of the corrected estimate of the frequency of the first signal includes removing a bias from the raw estimate of the frequency of the first signal; and wherein the forming of the raw estimate of the frequency of the first signal comprises utilizing a method selected from a group consisting of:

in-phase and quadrature domain autocorrelation based frequency estimation, normalized in-phase and quadrature domain autocorrelation based frequency estimation, and frequency domain averaging based frequency estimation.

2. The method of claim 1, wherein the forming of the raw estimate of the frequency of the first signal comprises utilizing in-phase and quadrature domain autocorrelation based frequency estimation.

3. The method of claim 1, wherein the forming of the raw estimate of the frequency of the first signal comprises utilizing normalized in-phase and quadrature domain autocorrelation based frequency estimation.

4. The method of claim 1, wherein the forming of the raw estimate of the frequency of the first signal comprises utilizing frequency domain averaging based frequency estimation.

5. The method of claim 1, wherein the determining of the multiplicative correction term comprises simulating behavior of a processing circuit executing frequency offset estimation.

6. The method of claim 5, wherein the determining of a multiplicative correction term further comprises:

creating a lookup table including a plurality of multiplicative correction terms including the multiplicative correction term, each of the plurality of multiplicative correction terms corresponding to a different signal to noise ratio, and looking up the multiplicative correction term in the lookup table.

7. The method of claim 5, wherein the simulating of the behavior of the processing circuit comprises:

generating simulated noise;

generating a simulated input including a sum of a noiseless signal and the simulated noise; and simulating the behavior of the processing circuit when fed the simulated input.

8. The method of claim 7, wherein the generating of the simulated noise comprises generating pseudorandom Gaussian white noise.

9. The method of claim 1, further comprising demodulating the first signal.

10. The method of claim 9, wherein the demodulating of the first signal comprises estimating a Gaussian frequency shift keying modulation in the first signal.

11. A system, comprising:

a processing circuit, configured to:

estimate a signal to noise ratio of a first signal;

determine a multiplicative correction term as a function of the signal to noise ratio only;

form a raw estimate of a frequency of the first signal; and multiply the multiplicative correction term and the raw estimate to form a corrected estimate of the frequency of the first signal, wherein the forming of the corrected estimate of the frequency of the first signal includes removing a bias from the raw estimate of the frequency of the first signal; and wherein the forming of the raw estimate of the frequency of the first signal comprises utilizing a method selected from a group consisting of:

in-phase and quadrature domain autocorrelation based frequency estimation, normalized in-phase and quadrature domain autocorrelation based frequency estimation, and frequency domain averaging based frequency estimation.

12. The system of claim 11, wherein the forming of the raw estimate of the frequency of the first signal comprises utilizing in-phase and quadrature domain autocorrelation based frequency estimation.

13. The system of claim 11, wherein the forming of the raw estimate of the frequency of the first signal comprises utilizing normalized in-phase and quadrature domain autocorrelation based frequency estimation.

14. The system of claim 11, wherein the forming of the raw estimate of the frequency of the first signal comprises utilizing frequency domain averaging based frequency estimation.

15. The system of claim 11, further comprising demodulating the first signal.

16. The system of claim 15, wherein the demodulating of the first signal comprises estimating a Gaussian frequency shift keying modulation in the first signal.

17. A receiver, comprising:

a first analog to digital converter to receive an in-phase signal and form a sequence of in-phase samples;

a second analog to digital converter to receive a quadrature phase signal and form a sequence of quadrature samples; and a processing circuit, to:

form a sequence of complex numbers from the sequence of in-phase samples and the sequence of quadrature samples;

estimate a signal to noise ratio of the sequence of complex numbers;

determine a multiplicative correction term as a function of the signal to noise ratio only;

form a raw estimate of a frequency of the sequence of complex numbers; and multiply the multiplicative correction term and the raw estimate to form a corrected estimate of the frequency of the sequence of complex numbers, wherein the forming of the corrected estimate of the frequency of the sequence of complex numbers includes removing a bias from the raw estimate of the frequency of the sequence of complex numbers; and wherein the forming of the raw estimate of the frequency of the sequence of complex numbers comprises utilizing a method selected from a group consisting of:

in-phase and quadrature domain autocorrelation based frequency estimation, normalized in-phase and quadrature domain autocorrelation based frequency estimation, and frequency domain averaging based frequency estimation.

18. The receiver of claim 17, wherein the forming of the raw estimate of the frequency of the sequence of complex numbers comprises utilizing:

in-phase and quadrature domain autocorrelation based frequency estimation; or normalized in-phase and quadrature domain autocorrelation based frequency estimation.

19. The receiver of claim 17, wherein the forming of the raw estimate of the frequency of the sequence of complex numbers comprises utilizing frequency domain averaging based frequency estimation.

20. The receiver of claim 17, further comprising demodulating the sequence of complex numbers, wherein the demodulating of the sequence of complex numbers comprises estimating a Gaussian frequency shift keying modulation in the sequence of complex numbers.

* * * * *